United States Patent [19]

Perez

[11] Patent Number: 5,183,671
[45] Date of Patent: Feb. 2, 1993

[54] APPARATUS FOR PROCESSING FISH FOOD

[76] Inventor: Thomas F. Perez, 21 Legeyt Rd., North Canton, Conn. 06059

[21] Appl. No.: 531,924

[22] Filed: Jun. 1, 1990

[51] Int. Cl.$^5$ .............................................. A23P 1/00
[52] U.S. Cl. .............................. 425/190; 425/192 S; 264/323; 426/516
[58] Field of Search .......................... 426/1, 516, 517; 425/376.1, 406, DIG. 57, 181, 183, 466, 190, 192 S; 264/323

[56] References Cited

U.S. PATENT DOCUMENTS

| | | | |
|---|---|---|---|
| 634,786 | 10/1899 | Willower | 425/376.1 |
| 679,983 | 8/1901 | O'Neil | 425/376.1 |
| 1,397,510 | 11/1921 | Grassi | 425/376.1 |
| 1,885,747 | 11/1932 | Maurer | 425/466 |
| 1,996,628 | 4/1935 | Schneider | 425/376.1 |
| 2,420,616 | 5/1947 | Palmer | 425/376.1 |
| 3,001,485 | 9/1961 | Czik | 425/181 |
| 3,264,685 | 8/1966 | Boggild et al. | 425/183 |
| 3,590,749 | 6/1971 | Burns | 425/DIG. 57 |
| 3,846,931 | 11/1974 | Block et al. | |
| 3,876,743 | 4/1975 | Soderlund et al. | |
| 3,928,641 | 12/1975 | Hoer | |
| 4,076,476 | 2/1978 | Ventura | 425/DIG. 57 |
| 4,260,640 | 4/1981 | Hartmann et al. | |
| 4,293,575 | 10/1981 | Cockram et al. | |
| 4,439,456 | 3/1984 | Kammuri et al. | |
| 4,534,992 | 9/1985 | Taguchi et al. | |
| 4,993,932 | 2/1991 | D'Andrade | 425/376.1 |

FOREIGN PATENT DOCUMENTS 541868  4/1942  United Kingdom ................. 264/176

Primary Examiner—R. B. Penland
Attorney, Agent, or Firm—Chilton, Alix & Van Kirk

[57] ABSTRACT

The fish food is in the form of a dense filament having a diameter of less than about 0.05 inch. The filament is produced by extruding a wad of viscous meal in an extrusion chamber and associated die. The preferred extrusion tool has a tubular member with an end piece containing a small aperture. The tool is held in one hand by a stationary handle, while the other hand advances a plunger through the tubular member, thereby extruding the filaments.

17 Claims, 2 Drawing Sheets

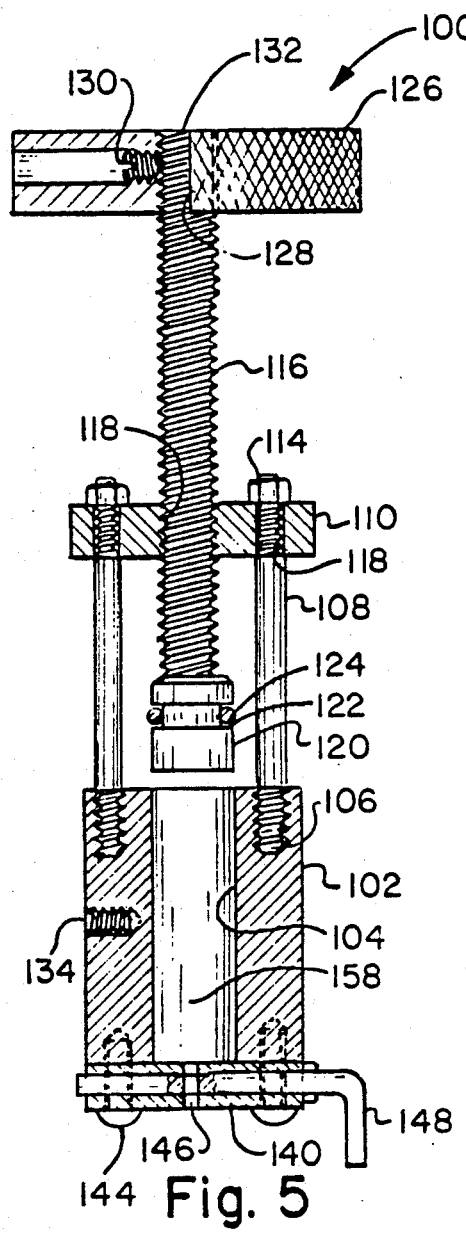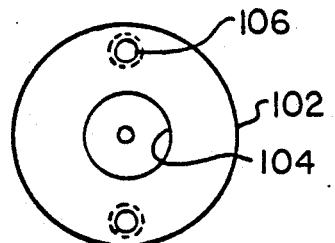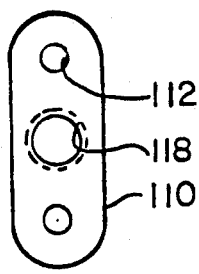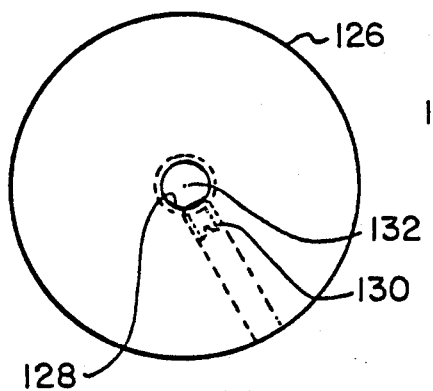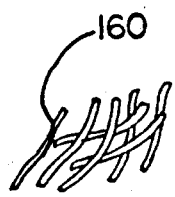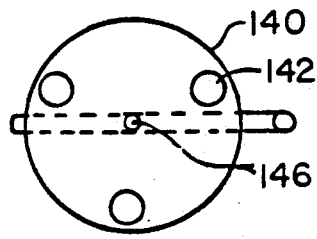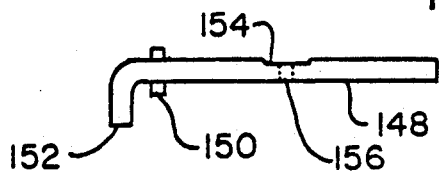

APPARATUS FOR PROCESSING FISH FOOD

BACKGROUND OF THE INVENTION

The present invention relates to the formulation, mixing, and presentation of food for fish, and more particularly, to a method and apparatus for preparing food for discus fish.

It is well known among hobbyists owning fish aquaria, that the discus fish, although prized for its beauty, is quite finicky with respect to diet. These fish require a high protein diet, and most hobbyists buy beef heart, shrimp, liver and other meat and vegetable ingredients, mix them with certain dairy products, and after blending, arrive at a dough-like, highly viscous batch of material having the consistency somewhat resembling that of children's clay. One such batch may provide sufficient food for feeding a few discus fish for about one month, but the batch must be frozen or at least refrigerated. For each feeding, a small portion of the clay-like mass must be cut away, thawed, and chopped up with a razor blade or the like for feeding.

Despite this extraordinary effort on the part of the hobbyist to obtain and mix fresh ingredients and devote the time and effort to preparing each meal as described above, many discus fish are reluctant to eat the fish meal prepared in this manner. This problem is particularly acute with young fish, fish that have recently been relocated to a new aquarium, and fish that are not in the best of health.

SUMMARY OF THE INVENTION

It is thus an object of the present invention to provide a method and apparatus for preparing fish food, particularly intended for discus fish, in a manner that is simpler than the conventional technique, yet that produces the food in a form that is more likely to be eaten by the fish.

More particularly, it is an object of the present invention to provide a method and apparatus for preparing fish food in the form of thin, worm-like filaments that are attractive to the fish, and more edible than the small chunks conventionally thrown into the fish tank.

According to the present invention, a wad of the thawed food material from the batch, is placed in a hand-held chamber having an end wall which functions as a die plate, through which the wad is extruded to produce the worm-like food product. This avoids the considerable manual operations and dexterity conventionally required in chopping up the thawed, clay-like material.

The fish food in the form of thin, worm-like filaments, sinks lazily with a wiggling motion when dropped in the fish tank. This motion attracts the fish, and thus the food is more attractively presented and ingested. This is especially important with newly acquired fish which are stressed and trying adapt to their new environment.

Another advantage is the decreased pollution of the water in the fish tank. The fish tend to ingest the inventive form of the food in one gulp, which significantly reduces the amount of breakage and thus uneaten food which contaminates the tank and disrupts the maintenance of optimum water chemistry. With conventional fish food which is dropped in the tank in small chunks, the fish bite the chunks, chew, and spit out pieces until the size is just right to swallow. The corollary to this advantage is that the fish eat a greater percentage of the food. This cuts costs for the hobbyist significantly, and, with the invention used in the context of breeding, the cost can be reduced dramatically. Moreover, the food can be accurately measured and calculated on a per fish basis.

The food in this form is amenable to the administration of medication to the fish. The fish enjoy eating the food in this form and eat almost all of it. This not only facilitates the ingestion of medication, but also provides better regulation of dosage. Because fish are more readily attracted to the food in this form, it is possible to present the food selectively to those fish which need medication, because they ingest the food almost immediately upon presentation. This is in contrast to conventional feeding, where the food chunks may linger in the water for some time before the fish randomly nibble and chew it until the right size in achieved for ingestion.

Another advantage is that no food coloring additives are needed. Many fish food formulas contain color additives to attract the fish to enhance ingestion. The food of the present invention is inherently attractive and readily ingested.

With the use of the tool according to the apparatus embodiment of the invention, the food is not only prepared in a more appealing and efficiently ingested form, but is prepared in a much shorter period of time. Although the formulation and mixing of the ingredients into a batch is conventional, the subsequent extrusion for preparing a particular meal, is much faster than dicing with a razor blade, and cleaning of the tool takes only about sixty seconds. Both the hobbyist and fish breeder benefits greatly by this improvement in efficiency.

Preferably, the tool includes a tubular member having an upper end and a lower, closed end defining an extrusion aperture no greater than about 0.05 inch and usually about 0.015–0.035 inch. A plunger member is situated for telescoping displacement axially within the tubular member. The plunger member has a first, closed end facing the lower end of the tubular member to define a chamber therebetween for confining a wad of the meal. The plunger includes an extension portion which defines the second end of the plunger member, and extends axially beyond the upper end of the tubular member. A frame member is rigidly connected to the exterior of the tubular member, and manually operable actuation means couple the plunger extension portion with the frame member. The actuation means provides a mechanical advantage for displacing the plunger member through the tubular member to extrude the wad through the aperture to produce the desired filaments.

BRIEF DESCRIPTION OF THE DRAWINGS

These and other objects and advantages of the invention will become evident from the following description of the preferred embodiments, with reference to the accompanying drawings, in which:

FIG. 5 is an elevation view of a second tool embodiment of the invention;

FIG. 6 is a top view of the housing portion of the tool of FIG. 5;

FIG. 7 is a top view of the guide plate portion of the tool of FIG. 5;

FIG. 8 is a top view of the actuating knob of the tool of FIG. 5;

FIG. 9 is a plan view of the handle to be inserted into the body portion of the tool of FIG. 5;

FIG. 10 is an end view of the extrusion plate including aperture of the tool of FIG. 5;

FIG. 11 is a plan view of an adapter piece for adjusting the extrusion aperture associated with the end piece of the tool of FIG. 5; and FIG. 12 is a schematic illustration of the form of the fish food in accordance with the invention.

DESCRIPTION OF THE PREFERRED EMBODIMENT

It is well known among hobbyists and breeders, that discus fish require a high protein diet made from fresh ingredients. Although a variety of recipes are known for providing adequate nutrition to discus fish, the following is a typical food formula:

| Cooked Beef Heart | 8 oz. |
|---|---|
| Cooked Liver | 8 oz. |
| Raw Shrimp | 4 oz. |
| Hard Boiled Egg | 2 oz. |
| Sea Salt | 1 tsp. |
| Boiled Spinach | 1 cup |
| Fish Vitamins | 2 tsp. |
| Unflavored Gelatin | 2 oz. |

Most recipes include red meat, fish, diary and vegetable ingredients. The food formula is processed through a blender or food processor until it is pureed. It is then placed in small containers and frozen. The most practical approach is to flatten the puree in the shape of a pancake or patty approximately one-quarter inch thick, place each in a plastic bag, and then freeze.

Figure 1:
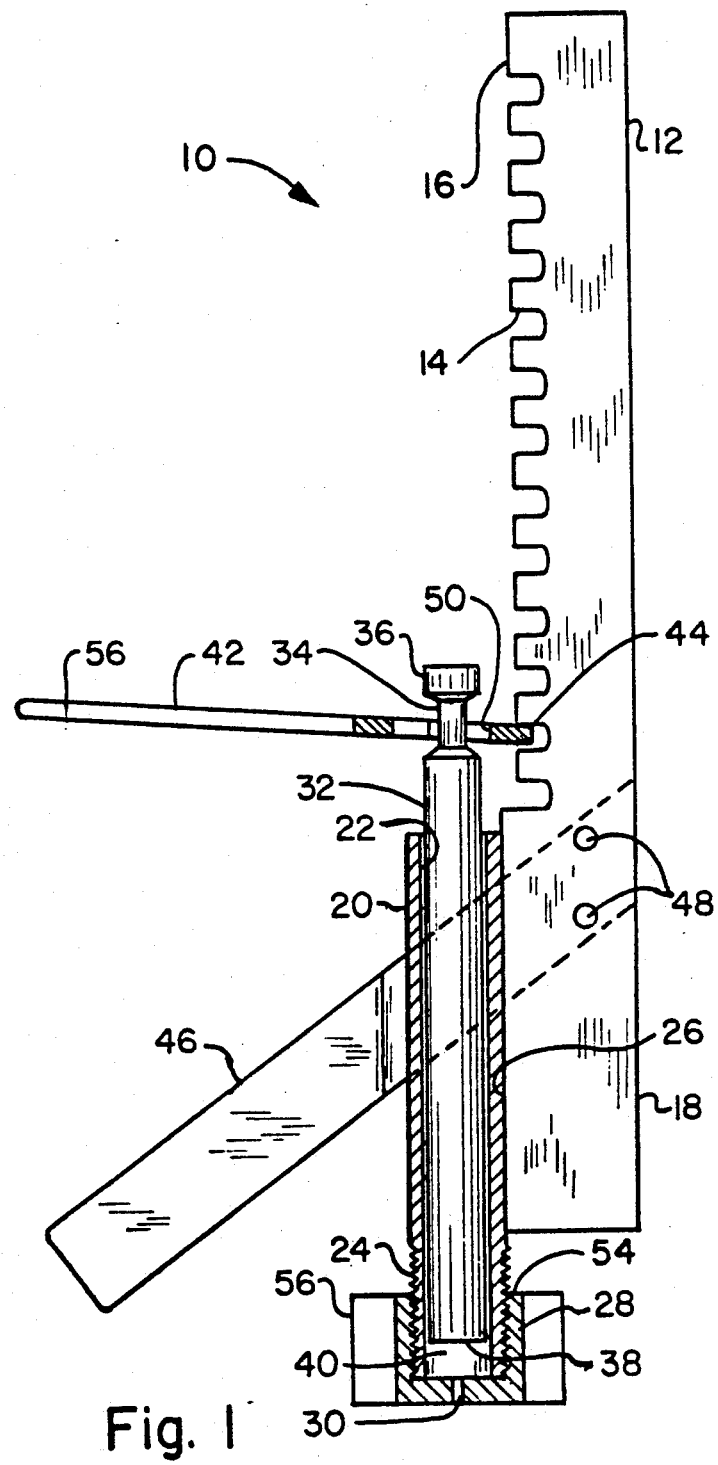
FIG. 1 is an elevation view of a first embodiment of a hand tool suitable for implementing the present invention.
Figure 2:
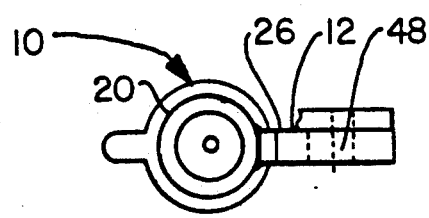
FIG. 2 is a top view of the frame and delivery tube portion of the tool of FIG. 1.
Figure 3:
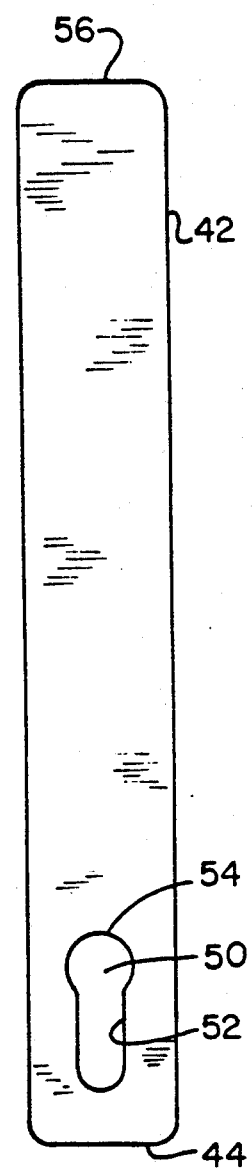
FIG. 3 is a plan view of the plunger lever associated with the tool of FIG. 1.

Approximately one hour in advance of feeding time for the fish, pieces are broken off one of the frozen patties and the unused portion is again placed in the bag and returned to the freezer. When the pieces have thawed, but while still cool, the pieces are cut into appropriately sized wads for placement into an extrusion tool such as that shown in FIG. 1. The tool itself should be cooled, for example by placing it in the refrigerator for one hour before the extrusion of the food product.

In the embodiment shown in FIGS. 1–4, the tool 10 includes an elongated frame 12 having an upper portion 16 on which are formed a plurality of teeth 14 along a lateral edge. At the other end 18 of the frame, a generally tubular member 20 is rigidly connected so that the axis thereof is substantially parallel to the longitudinal dimension of the frame 12 and to the row of teeth 14. The tubular member has an open first end 22 and external threads 24 at the other end. An end piece 28 is threadably secured to the tubular member 20, thereby closing the second end of the tube except for a small aperture 30 in the end wall.

A plunger member 32 is locatable within the cylindrical space inside the tubular member 20, and includes an upper extension portion extending axially beyond the opening 22, and a closed end 38 which faces the aperture 30 and defines an extrusion chamber 40 with the end piece 28, for confining the wad of food material to be extruded through aperture 30.

A first handle 42 in the form of a plunger lever, has one end 44 engaging a tooth formation 14 on frame 12, and a free end 56 adapted to be manually rotated about the axis which passes perpendicularly through the plane of the drawing at the point where the handle free end 44 engages the tooth. Intermediate the ends 44,56, the lever 42 has a keyhole 50 including an elongated portion 52 and an enlarged portion 54. The enlarged portion is sized to fit over the head 36 of the extension portion 34 of plunger 32, whereby the lever is retained on the smaller diameter neck portion of extension 34. With this arrangement, rotation in a counter-clockwise direction of the free end 56 of the lever 42, produces a mechanical advantage which forces the plunger member 32 substantially axially downward through tubular member 20, compressing the wad confined in chamber 40 and, under the increased pressure, extruding the wad through aperture 30 to produce thin strands or filaments.

The tool is preferably fitted with a second handle 46 which is secured at one end with bolts through bores 48 in the frame 12 adjacent the tubular member 20, for grasping by the user with the other hand. For example, the stationary handle 46 is grasped by the left hand while the actuating lever or handle 42 is grasped with the right hand, for facilitating the application of the compression force in chamber 40.

Figure 4:
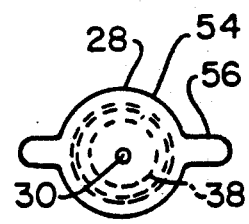
FIG. 4 is a bottom end view including the extrusion aperture of the tool shown in FIG. 1.

FIG. 4 shows a preferred embodiment of the end piece 28, which functions as a die. The substantially cylindrical central portion 54 is counter-bored and tapped to receive the threaded end 24 of the tubular member 20. The closed front wall or face has the extrusion aperture 30 formed therein, as by drilling. A pair of wings 56 extend radially from the central portion 54 to facilitate the manual locking and unlocking of the end piece 28 onto the threads 24. In this manner, a plurality of end pieces, each having a different aperture size, can be easily manually interchanged depending on the specific requirements of the fish, or the variations in the consistency of the wad.

Usually, the aperture 30 would be circular, but, if other shapes are used, the cross-sectional area can be correlated as an effective equivalent to a circular cross-section. In general, the effective diameter of the aperture 30 would be less than 0.05 inch, and more particularly, in the range of about 0.01 to 0.05 inch. The preferred range is between about 0.015 and 0.035 inch.

FIGS. 5–11 illustrate another embodiment of a tool 100 for use with the present invention. A body portion 102 is preferably substantially tubular with relatively thick walls surrounding the inner channel 104. At one end, the annular wall is drilled and tapped, as shown in FIG. 6, for receiving at least two spacer bars 108 which extend from the body 102 substantially parallel to the axis of channel 104. The spacer bars 108 threadably engage respective drilled and tapped holes 112 in guide plate 110, shown in FIG. 7. The guide plate 110 has an enlarged, drilled and tapped bore 118 coaxial with the channel 104, and is maintained in rigid, spaced relation from the body 102 by means of the nuts 114.

A threaded stem 116 passes axially through bore 118, and functions as an axial extension portion of plunger 120. The plunger 120 has a closed leading end which is adapted to pass through channel 104 for compressing the wad and extruding filaments thereof in a manner similar to that described with respect to the embodiment of FIG. 1. The plunger 120 is preferably mounted on extension 116 so as to not to rotate therewith, and preferably includes circumferential recess 122 carrying an 0-ring seal or the like 124. At the end 132 of the extension portion 116 opposite the plunger head 120, the stem 116 carries a manually operable actuation wheel or knob 126, which in turn may be threaded to the stem 116 as at 128, or slipped thereon and retained in place by a set screw 130 as shown in FIG. 8.

Preferably, the body portion 102 includes a drilled and tapped bore 134 extending partially through the lateral exterior wall, for receiving the threaded nose 138 of the stationary handle 136 shown in FIG. 9. Thus, analogous to the embodiment shown in FIG. 1, the user holds handle 136 in one hand while actuating the other handle 126 with the other hand, to displace the plunger 120 axially through channel 104.

In both embodiments, the tool is easily handled because the overall length, at least for use by hobbyists, is on the order of eight to twelve inches. The diameter of the tubular channel for receiving the wad is typically less than one inch, and preferably about one-half inch.

As shown in FIGS. 10 and 11, the end piece 140 in this embodiment is connected to the walls of the body portion 102 by means of a plurality of bolts 144 passing through drilled holes 142. The end piece 140 has an aperture 146 that is as large or larger than any that would be required for the purpose of the present invention, i.e., producing fish food filaments. An adjustment member 148 is selectively and interengageably insertable through (or behind) the end piece 140, for incorporating one of a variety of apertures 156 having an effective diameter less than the aperture 146 on the end piece 140. The adjustment piece 148 preferably has a handle 152 or the like and a stop 150 to assure that, when the stop 150 bears against the outer diameter or circumference of the end piece 140, the aperture 156 is in alignment with the aperture 146. Preferably, the aperture 156 is formed at a cavity, or region of reduced thickness 154, in the adjustment piece 148. The turning of piece 148 enables rapid expulsion of oversized particles. Thus, it should be appreciated that end piece 140 closes the channel 104 and defines a chamber with the plunger 120 at 158, whereby as the plunger is advanced, the wad is extruded through apertures 146,156 to produce the worm-like filaments. It should be further appreciated that the embodiment of FIG. 1 could readily be adapted to include end piece 140 and/or adjustment piece 148.

FIG. 12 schematically shows such worm-like filaments 160. As the tool is used to extrude filaments, a crossing movement of the hands should be made so that as the filaments fall to a flat surface, they do not lie flat on each other. This prevents matting and facilitates further cutting. Preferably, the filaments are deposited in a flat container which can be sealed and allowed to cool for one hour. This maintains the firmness of the filaments, while producing a dry surface which helps retain moisture.

When the fish are to be fed, a portion of the filament worms is taken from the sealed container and placed on the flat surface. The filaments are cut to the desired size with a sharp knife or razor blade. Typically, four cuts produces an ideal filament size. For discus fish, the ideal filament feeding size is about 0.025 inch diameter and about 0.25–1.0 inch in length depending on the size of the fish. Thus, the filaments have a length-to-diameter ratio of at least about ten.

I claim:

1. A fish food extruder for extruding a viscous wad of fish food into thin filaments, comprising:
    a tubular member having an upper end and a lower, closed end defining an extrusion aperture with an effective diameter no greater than about 0.05 inch;
    a plunger member situated for telescoping displacement axially within the tubular member, the plunger member having a first, closed end facing the lower end of the tubular member and defining a chamber therebetween for confining a wad of said fish food, and a plunger extension portion including a second end of the plunger member which extends axially beyond the upper end of the tubular member;
    a frame member extending longitudinally from the tubular member in parallel with the axis thereof, the frame member containing a plurality of teeth facing said axis; and
    manually operable actuating means coupling the plunger extension portion with the frame member, for selectively displacing the plunger member with a mechanical advantage through the tubular member to extrude the wad in the chamber through said aperture, the actuating means including a first handle comprising a lever having a pivot end for engaging one of said teeth, the lever including a free end to be grasped in one hand by the user for manually rotating the lever about said engaged tooth, means intermediate the pivot end and free end for engaging the plunger extension portion and is placing the plunger axially in the tubular member to extrude the wad as the lever is rotated in a first direction of rotation, and means for permitting the manual transfer of the pivot end of the lever to engage a tooth adjacent to the engaged tooth when the lever is rotated in a second direction of rotation opposite to the first direction of rotation, the actuating means further including a second handle rigidly connected to one of the tubular member and frame member to be grasped by the user's other hand while the user rotates the first handle in the first direction to extrude the wad.

2. The tool of claim 1, wherein
    the tubular member upper end is open, and
    the plunger member is axially removable from the tubular member so that said wad can be deposited in the tubular member before the plunger member is relocated within the tubular member for extruding the wad.

3. The tool of claim 1, wherein the closed end of the tubular member is defined by one of a plurality of interchangeable end pieces, each end piece having an aperture with a different effective diameter in the range of about 0.01 to 0.05 inch.

4. The tool of claim 1, wherein the aperture effective diameter is in the range of about 0.02 to 0.03 inch.

5. The tool of claim 1, wherein the aperture effective diameter is less than about 0.035 inch.

6. A fish food extruder, comprising:
    a tubular member having an upper end and a lower, closed end defining an extrusion aperture with an effective diameter no greater than about 0.05 inch;
    a plunger member situated for telescoping displacement axially within the tubular member, the plunger member having a first, closed end facing the lower end of the tubular member and defining a chamber therebetween containing a wad of fish food, and a plunger extension portion including a second end of the plunger member which extends axially beyond the upper end of the tubular member;

a frame member rigidly connected to the exterior of the tubular member; and manually operable actuating means coupling the plunger extension portion with the frame member, for selectively displacing the plunger member with a mechanical advantage through the tubular member to extrude the fish food in the chamber through said aperture, wherein the lower, closed end of the tubular member comprises an end piece and a rotatable adjustment member which is mountable proximate the end piece to provide an insert aperture that is smaller than, and alignable with, the extrusion aperture on the tubular member, and wherein the fish food comprises a viscous meal of high protein material containing at least one of shrimp, egg, spinach and gelatin.

7. The tool of claim 6, wherein the actuating means includes a first handle to be grasped in one hand by the user and rotated about a rotation axis passing through the frame; and the tool includes a second handle rigidly connected to one of the tubular member or frame member, to be grasped by the user's other hand while the user rotates the first handle to extrude the wad.

8. The tool of claim 6, wherein the tubular member upper end is open, and the plunger member is axially removable from the tubular member so that said wad can be deposited in the tubular member before the plunger member is relocated within the tubular member for extruding the wad.

9. The tool of claim 6, wherein the frame extends longitudinally from the tubular member in parallel with the axis thereof and contains a plurality of teeth facing said axis, and the actuating means includes a lever having a pivot end for engaging one of said teeth, a free end for manually rotating the lever about said engaged tooth, and means intermediate the ends of the lever, for engaging the plunger extension portion and displacing the plunger axially in the tubular member as the lever is rotated.

10. The tool of claim 6, wherein the adjustment member comprises one of a plurality of interchangeable adjustment members, each adjustment member having an insert aperture with a different effective diameter in the range of about 0.01 to 0.05 inch.

11. The tool of claim 6, wherein the insert aperture effective diameter is in the range of about 0.02 to 0.03 inch.

12. The tool of claim 6, wherein the insert aperture effective diameter is less than about 0.035 inch.

13. The tool of claim 6, wherein the adjustment member has a handle.

14. The tool of claim 6, wherein the adjustment member has a stop portion which can bear against the end piece when the insert aperture is aligned with the extrusion aperture.

15. A fish food extruder, comprising:

a tubular member having an upper end and a lower, closed end defining an extrusion aperture with an effective diameter no greater than about 0.05 inch;

a plunger member situated for telescoping displacement axially within the tubular member, the plunger member having a first, closed end facing the lower end of the tubular member and defining a chamber therebetween containing a wad of fish food, and a plunger extension portion including a second end of the plunger member which extends axially beyond the upper end of the tubular member;

a frame member rigidly connected to the exterior of the tubular member; and manually operable actuating means coupling the plunger extension portion with the frame member, for selectively displacing the plunger member with a mechanical advantage through the tubular member to extrude the fish food in the chamber through said aperture, the actuating means including a first handle to be grasped in one hand by the user and rotated about a rotation axis passing through the frame and a second handle rigidly connected to one of the tubular member and frame member to be grasped in the user's other hand, the first handle being movable relative to the second handle, wherein the fish food comprises a viscous meal of high protein material containing at least one of dairy products, vegetable matter, and cooked red meat.

16. The tool of claim 15, wherein the tubular member upper end is open, and the plunger member is axially removable from the tubular member so that said wad can be deposited in the tubular member before the plunger member is relocated within the tubular member for extruding the wad.

17. The tool of claim 15, wherein the frame extends longitudinally from the tubular member in parallel with the axis thereof and contains a plurality of teeth facing said axis, and the actuating means includes a lever having a pivot end for engaging one of said teeth, a free end for manually rotating the lever about said engaged tooth, and means intermediate the ends of the lever, for engaging the plunger extension portion and displacing the plunger axially in the tubular member as the lever is rotated.

* * * * *